Patented Jan. 9, 1923.

1,441,199

UNITED STATES PATENT OFFICE.

WALTER J. ADAMS AND JOHN L. CUMMINGS, OF MILWAUKEE, WISCONSIN.

PARTING COMPOUND.

No Drawing.    Application filed April 1, 1921. Serial No. 457,724.

*To all whom it may concern:*

Be it known that we, WALTER J. ADAMS and JOHN L. CUMMINGS, citizens of the United States, and residents of Milwaukee, in the county of Milwaukee and State of Wisconsin, have invented new and useful Improvements in Parting Compounds, of which the following is a description.

Our invention relates to a so-called parting compound or composition.

The object of the invention is the production of a powdered compound which is used in the molding departments of grey iron, brass, aluminum, steel and malleable foundries, and is applied by shaking the powdered compound through dust bags, the material being allowed to sift through the mesh of the cloth and fall upon the sand and pattern in order to prevent the pattern from sticking to the sand, and thus permit a perfect draw of the pattern and the making of a perfect mold. The compound also parts the sand in the sections between the cope and drag of the mold.

The composition consists of a mixture of powdered fossil earth, or kieselguhr and grease. The grease may be melted stearic acid, or any kind of oil, such as corn oil, linseed oil, or core oil, although stearic acid is preferably used. Also, if desired, with the fossil earth may be mixed the melted stearic acid and the oil ingredient.

In preparing the composition, we weigh on the scale 100 pounds of finely powdered fossil earth, and place this in a mixer which is heated to a temperature of 500 to 700° F. When the fossil earth is heated to this temperature, we add 1¾ pounds of grease, such as melted stearic acid. The same ratio, viz., 1¾ pounds is used in case corn oil, linseed oil, core oil, or any other kind of oil is used in addition to the stearic acid.

The mixed ingredients are next put through a roasting process in rotary kilns or large bowls, which permit the moving of the material to prevent burning, and the grease is roasted into the fossil earth, making it impervious to moisture.

When the material is properly roasted, it is then dumped from the machine, preferably automatically, and conveyed through metal spouts or by other means, to a large metal reservoir or large metal container, and is then allowed to cool, finally being passed through a fine screen to eliminate all coarse particles or foreign matter.

It has also been found by experience that it is advantageous to mix with the fossil earth, ground silica, 140 to 200 mesh, the preferred proportions being fifty per cent of each, although we do not desire to be understood as limiting ourselves to these particular proportions. If silica is mixed with the fossil earth, the same operations are gone through with respect to the other ingredients as hereinbefore described.

What we claim is:

1. A parting compound, comprising 100 pounds of powdered fossil earth, and 1¾ pounds of grease.

2. A parting compound, comprising 100 pounds of powdered fossil earth, 1¾ pounds of melted stearic acid, and 1¾ pounds of oil.

3. A parting compound, comprising powdered fossil earth, ground silica, grease and oil.

4. A parting compound, comprising powdered fossil earth in the proportion of 50% in weight and ground silica, in the proportion of 50% in weight, and 1¾ pounds of grease to every 100 pounds of the above mixed materials.

5. A parting compound, comprising powdered fossil earth in the proportion of 50% in weight and ground silica, in the proportion of 50% in weight, and 1¾ pounds of grease, and 1¾ pounds of oil to every 100 pounds of the above mixed materials.

6. A parting compound comprising a mixture of a fossil earth which has been heated, ground silica, stearic acid, and an oil, the whole having been roasted, cooled, and screened.

7. A parting compound comprising a mixture of a fossil earth stearic acid, and an oil, which has been heated, cooled and screened.

8. A parting compound comprising a mixture of a fossil earth which has been heated, ground silica, and grease, the whole having been roasted, cooled, and screened.

In testimony whereof, we affix our signatures.

WALTER J. ADAMS.
JOHN L. CUMMINGS.